(12) United States Patent
Moon et al.

(10) Patent No.: US 11,526,402 B2
(45) Date of Patent: Dec. 13, 2022

(54) SERVER

(71) Applicant: LG ELECTRONICS INC., Seoul (KR)

(72) Inventors: Hyeojun Moon, Seoul (KR); Youngwook Kim, Seoul (KR); Hongkun Yoo, Seoul (KR); Juhee Kim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 152 days.

(21) Appl. No.: 17/031,773

(22) Filed: Sep. 24, 2020

(65) Prior Publication Data

US 2021/0149768 A1 May 20, 2021

(30) Foreign Application Priority Data

Sep. 24, 2019 (KR) .................. 10-2019-0117681

(51) Int. Cl.
*G06F 11/00* (2006.01)
*G06F 11/14* (2006.01)
*G06F 16/16* (2019.01)
*H04L 67/06* (2022.01)

(52) U.S. Cl.
CPC ...... *G06F 11/1451* (2013.01); *G06F 11/1438* (2013.01); *G06F 16/16* (2019.01); *H04L 67/06* (2013.01); *G06F 2201/82* (2013.01)

(58) Field of Classification Search
CPC ............ G06F 11/1451; G06F 11/1438; G06F 11/1443; G06F 2201/82; H04L 67/06; H04L 67/145; H04L 67/2842; H04L 29/08612; H04L 29/08801; H04L 29/08819

See application file for complete search history.

(56) References Cited

U.S. PATENT DOCUMENTS

| | | | |
|---|---|---|---|
| 6,381,709 B1* | 4/2002 | Casagrande | ............ H04L 67/34 714/748 |
| 7,913,115 B1* | 3/2011 | Powers | ............... G06F 11/0748 714/18 |
| 9,471,436 B2* | 10/2016 | Rash | .................... G06F 11/1471 |
| 2008/0065782 A1* | 3/2008 | Jones | .................... H04L 69/329 709/240 |
| 2019/0147070 A1* | 5/2019 | Rantzau | ............. G06F 16/2358 707/648 |

* cited by examiner

*Primary Examiner* — Marc Duncan
(74) *Attorney, Agent, or Firm* — Lee, Hong, Degerman, Kang & Waimey PC

(57) ABSTRACT

Disclosed is a server. A server according to an embodiment of the present disclosure includes a gatherer configured to receive a file collection list from an external server, at least one wagon configured to collect data from the external server based on the file collection list received from the gatherer, a historian file configured to store a transmission history or a file collection history, and a destination folder configured to store the data collected by the wagon, and the wagon is further configured to, when an error occurs during data collection, collect data for a file again in which the error occurs. Accordingly, it is possible to quickly collect data again when an error occurs.

16 Claims, 10 Drawing Sheets

FIG. 7

SERVER

CROSS-REFERENCE TO RELATED APPLICATION

Pursuant to 35 U.S.C. § 119(a), this application claims the benefit of earlier filing date and right of priority to Korean Patent Application No. 10-2019-0117681, filed on Sep. 24, 2019, the contents of which are hereby incorporated by reference herein in its entirety.

BACKGROUND OF THE DISCLOSURE

1. Field of the Disclosure

The present disclosure relates to a server, and more particularly, to a server capable of quickly collecting data again when an error occurs.

2. Related Art

When it comes to collecting large amounts of big data, there are problems of data loss and data redundancy.

Flume and Nifi are open source solutions that are frequently used as a collector among Hadoop Eco Systems for big data.

In order to prevent problems that occur when collecting large amounts of data, these solutions process the data by using a memory buffer for increasing a processing speed despite a risk of data loss and a buffer file for securing stability despite a risk of data redundancy. However, if a system error occurs, data loss occurs.

SUMMARY OF THE DISCLOSURE

The present disclosure provides a server capable of quickly collecting data again when an error occurs.

The present disclosure also provides a server capable of, when data is redundantly collected, determining as to data redundancy before storing data.

According to an aspect of the present disclosure, there is provided a server including: a gatherer configured to receive a file collection list from an external server, at least one wagon configured to collect data from the external server based on the file collection list received from the gatherer, a historian file configured to store a transmission history or a file collection history, and a destination folder configured to store the data collected by the wagon, and the wagon is further configured to, when an error occurs during data collection, collect data for a file again in which the error occurs.

Meanwhile, the wagon may be further configured to: when the error occurs during the data collection, be changed to a ROLLBACK state and collect, according to the ROLLBACK state, the data for the file again in which the error occurs.

Meanwhile, the historian file may be further configured to delete the file collection history when the wagon is in the ROLLBACK state due to the error occurring during the data collection.

Meanwhile, the wagon may be further configured to, when a system kill signal is received during the data collection, be changed to a DIED state, and, when the wagon is executed again, the wagon may be further configured to be changed to a ROLLBACK state and collect, according to the ROLLBACK state, the data for the file again in which the error occurs during the data collection.

Meanwhile, the wagon and the gatherer may be terminated when the system kill signal is received during the data collection.

Meanwhile, the historian file may be further configured to delete the file collection history when the wagon is in the ROLLBACK state after the wagon is terminated in accordance with the system kill signal.

Meanwhile, the wagon may be further configured to check the file collection history of the historian file and, when there is no file collection history, perform a control to store collected data in the destination folder.

Meanwhile, the server may further include a temporary folder configured to check the file collection history of the historian file and, when there is no file collection history, temporarily store collected data, and the temporary folder may be further configured to, when file collection is terminated, move a file from the temporary folder to the destination folder.

Meanwhile, the historian file may be further configured to, when the moving of the file from the temporary folder to the destination folder is completed, store a file collection history according to normal collection completion.

Meanwhile, the wagon may be further configured to collect data in parallel from the external server.

According to another aspect of the present disclosure, there is provided a server, including a communication device configured to receive data from an external server, a processor configured to receive a file collection list from the external server and collect data from the external server based on the file collection list, and a memory configured to store a transmission history or a file collection history, and the processor may be further configured to, when an error occurs during data collection, collect data for a file again in which the error occurs.

Meanwhile, the processor may be further configured to, when the error occurs during the data collection, be changed to a ROLLBACK state and collect, according to the ROLLBACK state, the data for the file again in which the error occurs.

Meanwhile, the processor may be further configured to delete the file collection history when the processor is in the ROLLBACK state due to the error occurring during the data collection.

Meanwhile, the processor may be further configured to, when a system kill signal is received during the data collection, stop the data collection, and, when the data collection is restarted, collect the data for the file again in which the error occurs during the data collection.

Meanwhile, the processor may be further configured to delete the file collection history when the data collection is stopped in accordance with the system kill signal.

Meanwhile, the memory may include a destination folder configured to store data collected by the processor, and the processor may be further configured to check the file collection history of the memory and, when there is no file collection history, perform a control to store collected data in the destination folder.

Meanwhile, the memory may include a temporary folder configured to temporarily store the collected data, and the temporary folder may be further configured to, when file collection is terminated, move a file from the temporary folder to the destination folder.

Meanwhile, the processor may be further configured to, when the moving of the file from the temporary folder to the destination folder is completed, perform a control to store a file collection history according to normal collection completion.

BRIEF DESCRIPTION OF THE DRAWINGS

The above and other objects, features and advantages of the present disclosure will be more apparent from the following detailed description in conjunction with the accompanying drawings, in which:

FIGS. 4 to 10 are diagrams referred to explain operations of the server of FIG. 3.

DESCRIPTION OF EMBODIMENTS

Hereinafter, the present disclosure will be described in more detail with reference to the drawings.

In the following description, suffixes "module" and "unit" used to signify components in the following description are used herein to aid in understanding of the components and thus they should not be considered as having specific meanings or roles. Therefore, the "module" and "unit" can be used interchangeably with each other.

Figure 1:
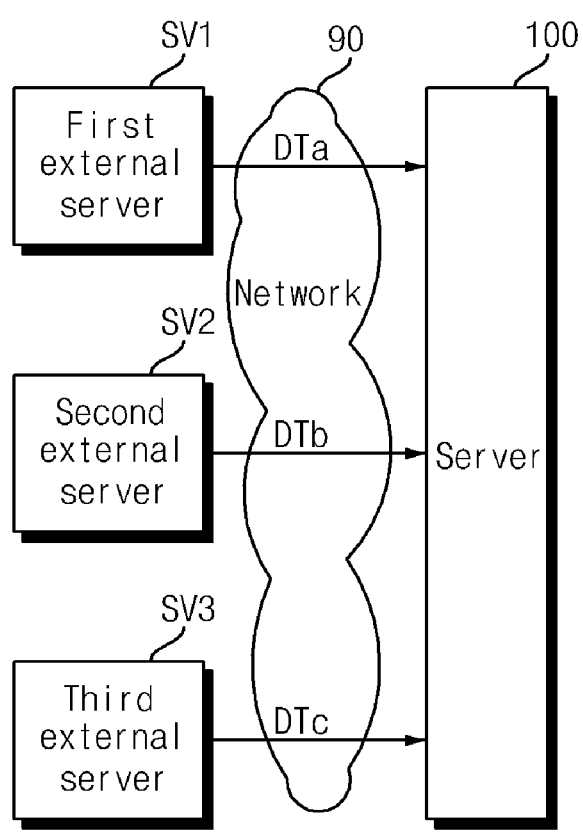
FIG. 1 is a diagram illustrating a big data collection system according to an embodiment of the present disclosure.

FIG. 1 is a diagram illustrating a big data collection system according to an embodiment of the present disclosure.

Referring to FIG. 1, a big data collection system 10 of FIG. 1 may a plurality of servers SV1, SV2, and SV3, and a server 100 that collects data from the plurality of servers SV1, SV2, and SV3 through a network 90.

In this case, the server 100 may collect big data.

Meanwhile, the plurality of servers SV1, SV2, and SV3 may be classified into a first external server SV1, a second external server SV2, and a third external server SV3, respectively.

Meanwhile, the server 100 according to an embodiment of the present disclosure may quickly collect data again when an error occurs during data collection.

In addition, when data is redundantly collected, the server 100 according to an embodiment of the present disclosure may determine as to whether the data is redundant, before storing the data.

To this end, the server 100 according to an embodiment of the present disclosure may include a communication device 135 for receiving data from the external server SV1, a processor 170 for receiving a file collection list from the external server SV1 and collecting data from the external server SV1 based on the file collection list, and a memory 140 for storing a transmission history or a file collection history.

Meanwhile, when an error occurs during data collection, the processor 170 within the server 100 according to an embodiment of the present disclosure may collect data for a file again in which the error occurs. Accordingly, it is possible to quickly collect data again when an error occurs. In particular, since data for a file in which an error occurs is collected again before the data is stored, it is possible to quickly collect the data again. In addition, when data is redundantly collected, whether the data is redundant may be determined before the data is stored.

Meanwhile, when an error occurs during data collection, the server 100 may be changed to the ROLLBACK state, and according to the ROLLBACK state, the server 100 may collect data for a file again in which the error occurs. Accordingly, it is possible to quickly collect data again when an error occurs.

Meanwhile, when the server 100 is in the ROLLBACK state since an error occurs during data collection, the server 100 may delete a file collection history. Accordingly, it is possible to quickly collect data again when an error occurs.

Meanwhile, when a system kill signal is received during data collection, the server 100 may stop the data collection, and when the data collection is restarted, the server 100 may collect data for a file again in which an error occurs during the data collection. Accordingly, it is possible to quickly collect data again when an error occurs.

Meanwhile, when data collection is stopped in accordance with a system kill signal, the server 100 may delete a file collection history. Accordingly, it is possible to stop data collection and then quickly collect data again.

Figure 2:
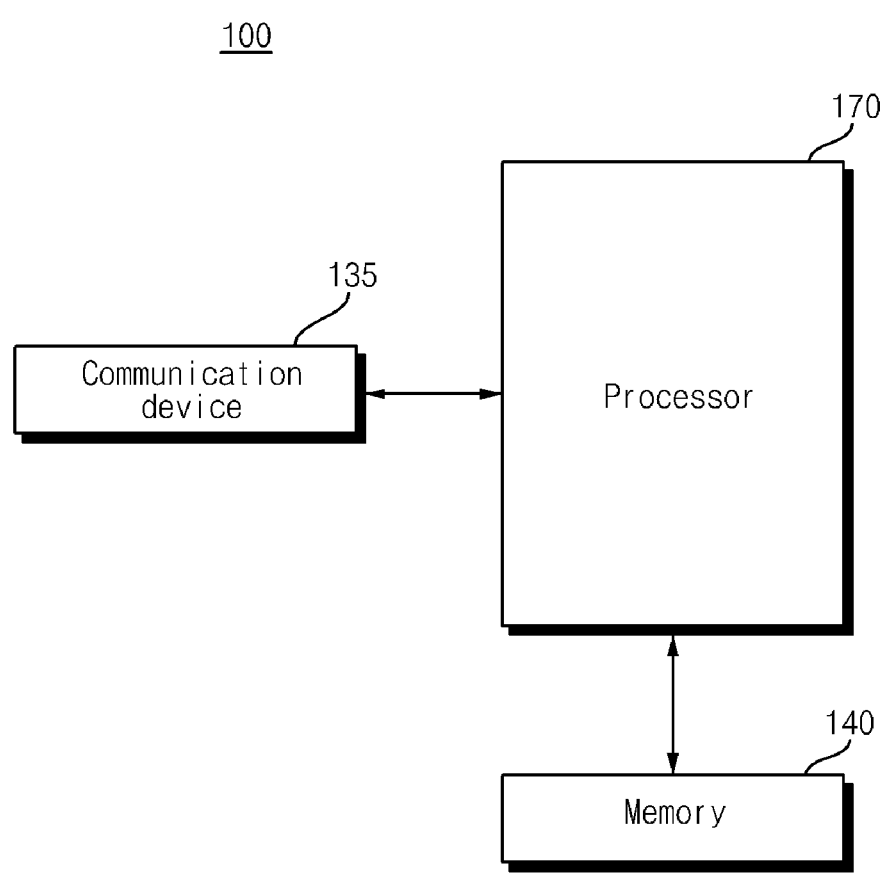
FIG. 2 is a simplified internal block diagram of a server illustrated in FIG. 1.

FIG. 2 is a simplified internal block diagram of a server illustrated in FIG. 1.

Referring to FIG. 2, a server 100 may include a communication device 135, a processor 170, and a memory 140.

The communication device 135 may receive data or transmit data from an external network 90.

For example, the communication device 135 may receive data from a first external server SV1, a second external server SV2, a third external server SV3, and the like. In particular, big data may be received.

The memory 140 may store data necessary for an operation of the server 100.

For example, the memory 140 may store a transmission history or a file collection history.

Meanwhile, the memory 140 may include a destination folder for storing data collected by the processor 170.

In addition, the memory 140 may further include a temporary folder TF for temporarily storing collected data.

Meanwhile, when file collection is finished, the temporary folder TF may move a file from the temporary folder TF to a destination folder FF. Accordingly, whether data is redundant may be determined before data is stored, and, if not, collected data may be stored.

Meanwhile, the processor 170 may perform control for overall operations of the server 100.

Meanwhile, the processor 170 may receive a file collection list from the external server SV1 and collect data from the external server SV1 based on the file collection list.

Meanwhile, when an error occurs during data collection, the processor 170 may collect data for a file again in which the error occurs. Accordingly, it is possible to quickly collect data again when an error occurs. In particular, since data for a file in which an error occurs is collected again before the data is stored, it is possible to quickly collect the data again. In addition, when data is redundantly collected, whether the data is redundant may be determined before the data is stored.

Meanwhile, when an error occurs during data collection, the processor 170 may be changed to the ROLLBACK state, and, according to the ROLLBACK state, the processor 170 may collect data for a file again in which the error occurs. Accordingly, it is possible to quickly collect data again when an error occurs.

Meanwhile, when the processor 170 is in the ROLLBACK state since an error occurs during data collection, the processor 170 may delete a file collection history. Accordingly, it is possible to quickly collect data again when an error occurs.

Meanwhile, when a system kill signal is received during data collection, the processor 170 may stop the data collection, and when the data collection is restarted, data for a file in which an error occurs during the data collection may be collected again. Accordingly, it is possible to quickly collect data again when an error occurs.

Meanwhile, when data collection is stopped in accordance with a system kill signal, the processor 170 may delete a file collection history. Accordingly, it is possible to stop data collection and then quickly collect data again.

Meanwhile, the processor 170 may check a file collection history of the memory 140, and, if there is no file collection history, the processor 170 may perform a control to store collected data in the destination folder FF. Accordingly, whether the data is redundant may be determined before the data is stored, and, if the data is not redundant, the collected data may be stored.

Meanwhile, when moving a file from the temporary folder TF to the destination folder FF is completed, the processor 170 may perform a control to store a file collection history according to normal collection completion. Accordingly, it is possible to prevent collection of redundant data.

Figure 3:
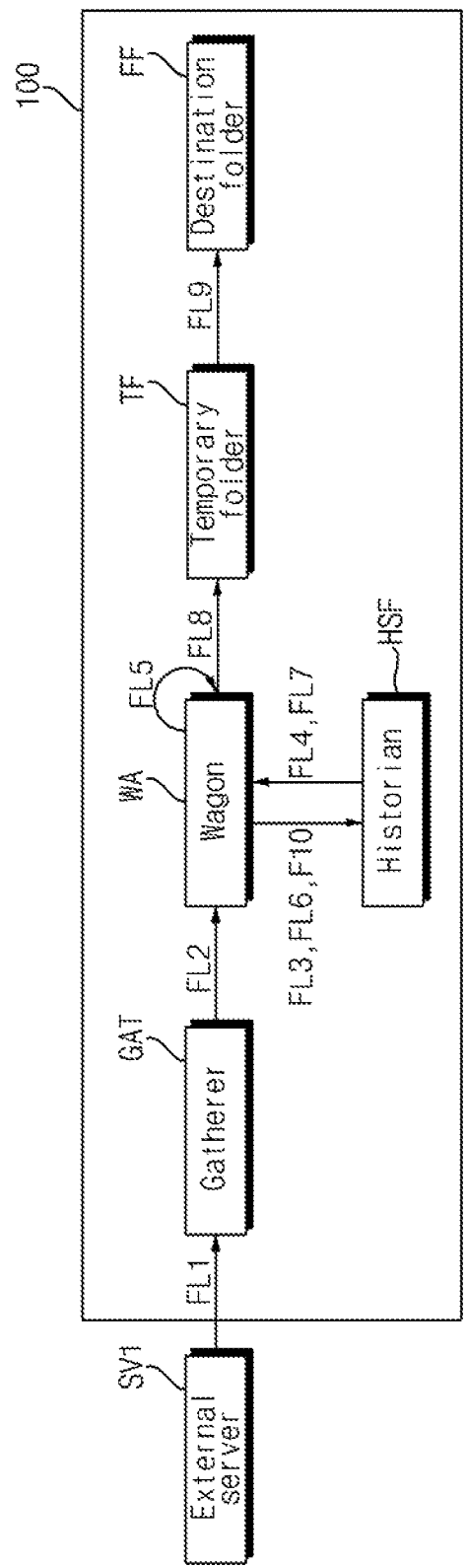
FIG. 3 is an example of a block diagram of a server according to an embodiment of the present disclosure.

FIG. 3 is an example of a block diagram of a server according to an embodiment of the present disclosure.

Referring to FIG. 3, a server 100 according to an embodiment of the present disclosure may include a gatherer GAT for receiving a file collection list from an external server SV1, at least one wagon WA for collecting data from the external server SV1 based on the file collection list, which is received from the gather GAT, a historian file HSF for storing a transmission history or a file collection history, and a destination folder FF for storing the data collected by a wagon WA.

Meanwhile, the server 100 according to an embodiment of the present disclosure may further include a temporary folder TF for checking a file collection history of the historian file HSF and, when there is no file collection history, temporarily storing collected data.

In FIG. 3, the gatherer GAT and the wagon WA may be provided in the processor 170 of FIG. 2.

Meanwhile, the historian file HSF, the temporary folder TF, and the destination folder FF in FIG. 3 may be provided in the memory 140 of FIG. 2.

The gatherer GAT may receive a file collection list from the external server SV1 in FL1.

The wagon WA may receive the file collection list from the gatherer GAT in FL2.

Next, the wagon WA may check a collection history of the received file collection list from the transmission history or the file collection history stored in the historian file HSF in FL3.

When the collection history exists in FL4, the wagon WA may skip data collection for data regarding which the collection history exists, and may move to a next file in FL5.

Meanwhile, the wagon WA may check a collection history of a received next data file using the historian file HSF in FL6.

If the collection history does not exist in FL7, the wagon WA may collect data of the next file and store the collected data of the next file in the temporary folder in FL8.

Next, when file collection is finished, the temporary folder TF may move a file from the temporary folder TF to the destination folder FF in FL9.

Next, when moving the file from the temporary folder to the destination folder FF, the historian file HSF may store a file collection history according to normal collection completion in FL10. Accordingly, it is possible to prevent collection of redundant data.

In the present disclosure, the concept of transaction guarantee is used to prevent collection of redundant data and to quickly collect a file again in which an error occurs.

Accordingly, when an error occurs in a process from collecting data to moving final data to a destination, the server 100 according to an embodiment of the present disclosure may perform ROLLBACK to prevent data loss and data redundancy.

Meanwhile, the server 100 according to an embodiment of the present disclosure may execute the gatherer GAT in parallel so that files having big data contained therein can be quickly and concurrently collected.

In this case, it is desirable to unify a collection list. With this unification of the collection list, it is possible to manage the details of the list so as to prevent data redundancy and data loss. In addition, it is possible to guarantee the integrity of the collection by rolling back the collection list through the temporary folder TF until the recording of the collected data is completed.

Meanwhile, when an error occurs during data collection, the wagon WA may collect data for a file again in which the error occurs. Accordingly, it is possible to quickly collect data again when an error occurs. In particular, data for a file in which an error occurs may be collected again through the wagon WA before the data is stored, and therefore, it is possible to quickly collect the data again. In addition, when data is redundantly collected, whether the data is redundant may be determined before the data is stored.

Meanwhile, when an error occurs during data collection, the wagon WA may be changed to the ROLLBACK state, and, according to the ROLLBACK state, the wagon WA may collect data for a file again in which the error occurs. Accordingly, it is possible to quickly collect data again when an error occurs.

Meanwhile, when the wagon WA is in the ROLLBACK state since an error occurs during data collection, the historian file HSF may delete a file collection history. Accordingly, it is possible to quickly collect data again when an error occurs.

Meanwhile, when a system kill signal is received during data collection, the wagon WA may be changed to the DIED state. When the wagon WA is executed again, the wagon WA may be changed to the ROLLBACK state, and according to the ROLLBACK state, the wagon WA may collect data for a file again in which an error occurs during data collection. Accordingly, it is possible to quickly collect data again when an error occurs.

Meanwhile, when a system kill signal is received during data collection, the wagon WA and the gatherer GAT may be terminated. Accordingly, it is possible to stop data collection and then quickly collect data again.

Meanwhile, when the wagon WA is in the ROLLBACK state after the wagon WA is terminated in accordance with a system kill signal, the historian file HSF may delete a file collection history. Accordingly, it is possible to stop data collection and then quickly collect data again.

Meanwhile, the wagon WA may check a file collection history of the historian file HSF and, if the file collection history does not exist, the wagon WA may perform a control to store collected data in the destination folder FF. Accordingly, whether the data is redundant may be determined before the data is stored, and, if the data is not redundant, the collected data may be stored.

Meanwhile, the wagon WA may collect data in parallel from the external server SV1. Accordingly, it is possible to quickly collect data.

Figure 4:
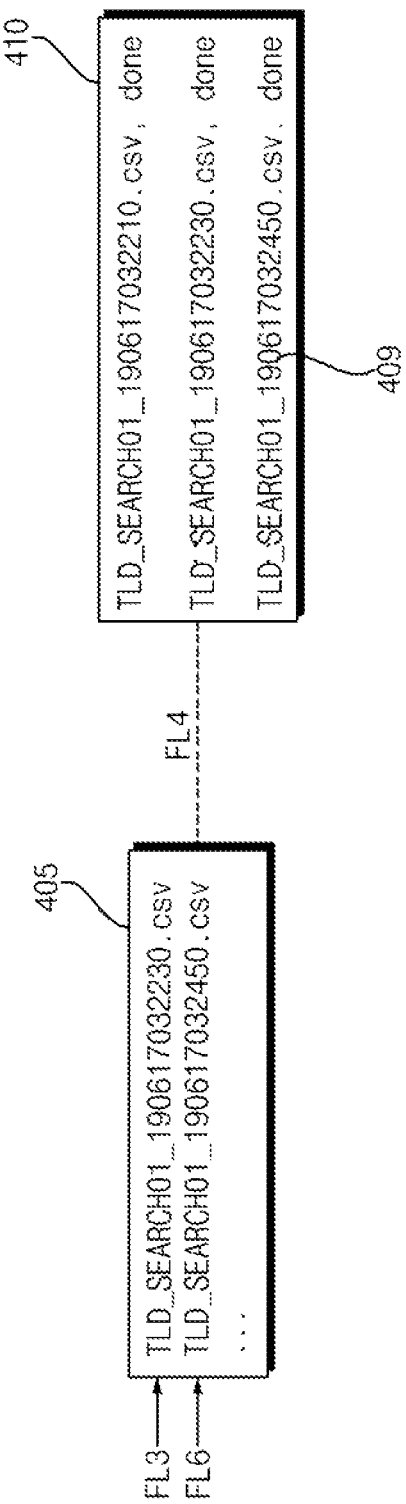

FIG. 4 is a diagram illustrating a collection list 405 and a historian file 410.

The collection list 405 may be "TLD_SEARCH01_190617032230.csv" and "TLD_SEARCH01_190617032450.csv", as shown in FIG. 4.

The historian file 410 may be "TLD_SEARCH01_190617032210.csv, done", "TLD_SEARCH01_190617032230.csv, done", and "TLD_SEARCH01_190617032450.csv, done" 409, as shown in FIG. 4.

In this case, "TLD_SEARCH01_190617032450.csv, done" 409 may be formed when data collection is completed.

Since "TLD_SEARCH01_190617032230.csv" in the collection list 405 corresponds to "TLD_SEARCH01_190617032230.csv, done" in the historian file 410, it may be determined that a collection history exists.

Since "TLD_SEARCH01_190617032450.csv" in the collection list 405 does not correspond to any one of "TLD_SEARCH01_190617032210.csv, done" and "TLD_SEARCH01_190617032230.csv, done" in the historian file 410, it is determined that a collection history does not exist.

Accordingly, data associated with "TLD_SEARCH is 01_190617032450.csv" may be received, stored in the temporary folder TF, and then moved to the destination folder FF.

In addition, when storing the data in the destination folder FF is completed, "TLD_SEARCH01_190617032450.csv, done" 409 may be formed in the historian file 410.

Figure 5:
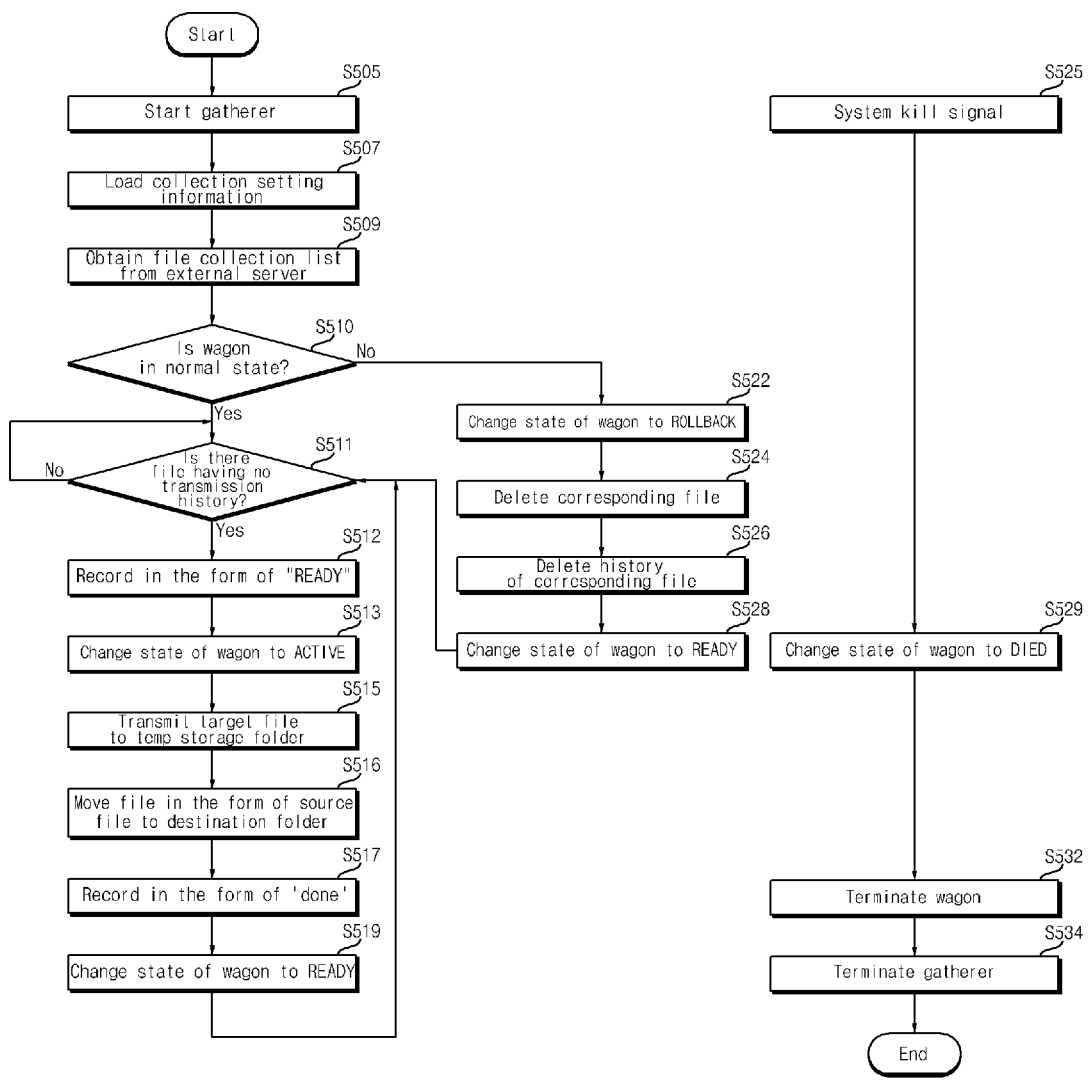

FIG. 5 is a flow chart illustrating an example of a method of operating the server 100 according to an embodiment of the present disclosure.

Referring to FIG. 5, when the gatherer GAT is executed in S506, the gather GAT may load collection setting information in S507 and may obtain a file collection list from the external server SV1 in S509.

In order to quickly collect data in parallel, the gatherer GAT may include multiple wagons WAs for collecting actual data.

A wagon WA may be in any of four states including READY, ACTIVE, DIED, and ROLLBACK.

When the state of the wagon WA is normal in S510, that is, when the wagon WA is in the READY state, whether a transmission history or a file collection history exists in the historian file HSF may be determined in order to prevent redundant collection of a target file in S511.

If the transmission history or file collection history does not exist, the historian file HSF may be recorded in the form of "file name, READY" in S511, and the state of the wagon WA may also be changed to Active (collection in progress) in S513.

Meanwhile, a collected file may be changed to an arbitrary filename extension (.ing) in a local folder (temp) TF that serves as a temporary storage. This is to prevent data loss caused by problems occurring at the time of collection (System Kill, Server Down, etc.).

Meanwhile, after file collection is finished, the file may be returned to its original file extension and then transmitted from the temporary folder TF in S515, and accordingly, the file may be moved from the temporary folder TF to the destination folder FF in S516.

The file may be recorded in the form of "filename, done" in the historian file HSF as a history indicating that the file has been successfully collected in S517, and the state of the wagon WA may also be changed to READY in S519 and then the process may go back to an initial collection stage to collect a next file.

If the state of the wagon WA is not in the READY state in operation S510, it may be determined that there was an error in previous transmission and a rollback may be performed.

According to the rollback, the state of the wagon WA may be changed to ROLLBACK in S522, the corresponding file may be deleted in S524, a historian file HSF history of the corresponding file may be deleted in S526, and the state of the wagon WA may be changed to READY in S528.

In doing so, the wagon WA may be able to transmit again a file in which an error occurs, and the integrity of data collection may be guaranteed.

Meanwhile, when a system kill signal occurs during a collection process in S525, the state of the wagon WA may become the DIED state in S529.

Then, the wagon WA may be terminated in S532, and the gatherer GAT may be terminated in S534.

Then, when the wagon WA is executed again, the state of the wagon WA may be restored to its normal state through rollback.

Figure 6:
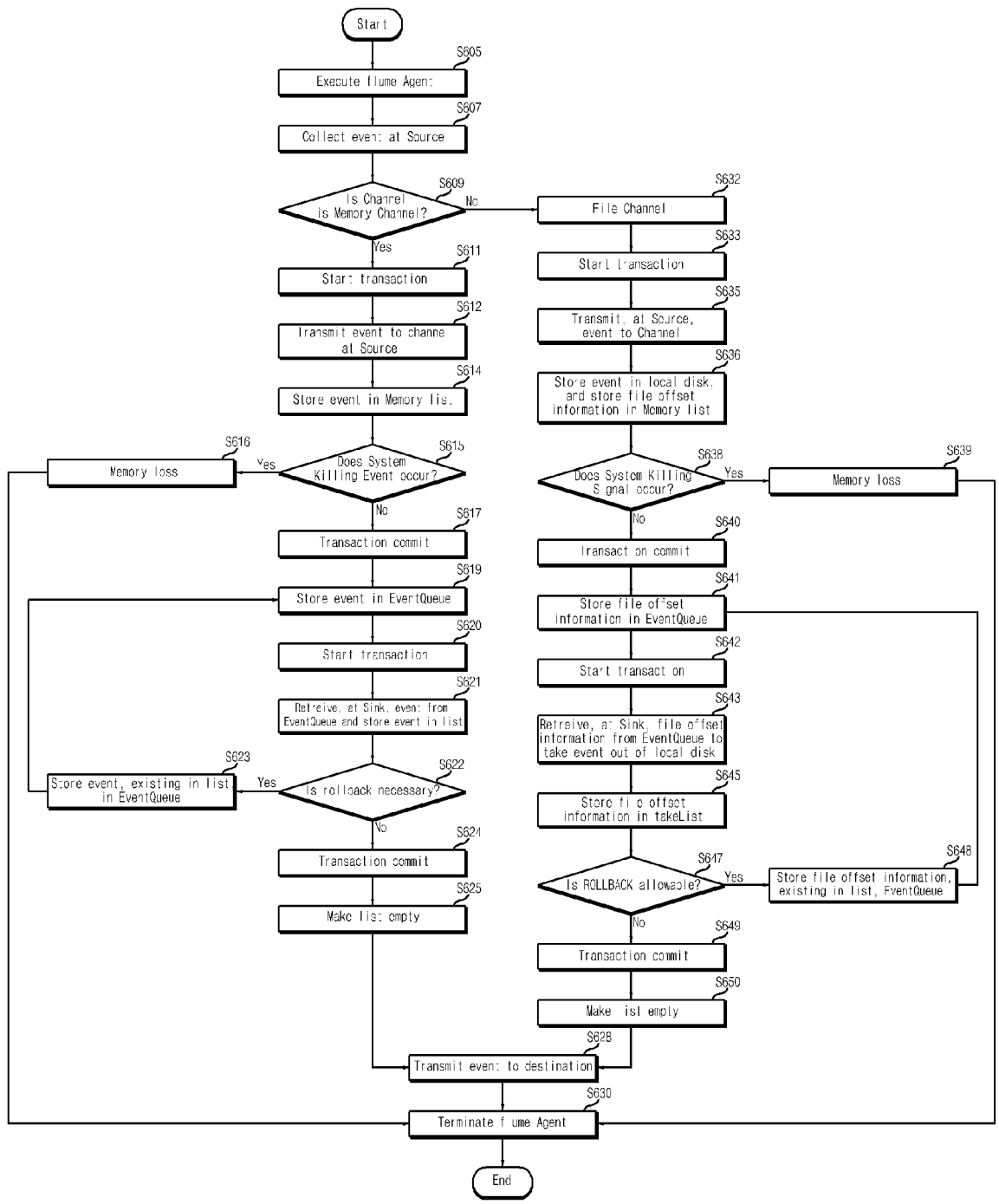

FIG. 6 is a flowchart illustrating a method of operating a server 100 related to the present disclosure.

Referring to FIG. 6, when a flume agent is executed in S606, an event may be collected from a source (for example, an external server SV1) in S607, and it may be determined whether a channel is a memory channel in S609.

If the channel is a memory channel, a transaction may be started in S611, and an event may be transmitted from the source (e.g., an external server SV1) to the channel in S612.

Then, the event may be stored in the memory list in S614.

In this case, it is determined whether a system kill signal is generated in S615, and if so, the memory may be lost in S616. That is, data in the memory may be erased.

Meanwhile, if a system kill signal does not occur, a transaction commit may be performed in S617, an event may be stored in an event queue in S619, and a transaction may be started in S620.

Next, the server 100, which is a sink, may take the event out of the event queue and stores the event in the list in S621.

Then, the server 100 may determine whether a rollback is necessary in S622, and, if a rollback is necessary, may store the event, existing in the list, in the event queue again in S623.

Meanwhile, if ROLLBACK is not allowable, a transaction commit may be executed in S624, and the list may be caused empty in S625.

Then, the event may be transmitted to the destination in S628, and the flume agent may be terminated in S630.

Meanwhile, if the channel is not a memory channel in S609, it is determined as a file channel, rather than a memory channel, in S632.

Then, a transaction may be started in S631, and an event may be transmitted from the source (e.g., an external server SV1) to the channel in S635.

Then, the event may be stored in a local list, and file offset information may be stored in the memory list in S636.

In this case, whether a system kill signal occurs may be determined in S638, and, if so, a data loss in the memory may occur in S639. That is, data in the memory may be erased.

Meanwhile, if the system kill signal does not occur, a transaction commit may be performed in S640, the file offset information may be stored in the event queue in S641 and a transaction may be started in S642.

Next, the sink server 100 may retrieve the file offset information from the event queue to take the event out of the local disk in 643. Then, the file offset information may be stored in a take list in S645.

Then, the server 100 may determine whether a rollback is necessary in S647, and if a rollback is necessary, the server 100 may store the file offset information, existing in the list, in the event queue again in S648.

Meanwhile, if a rollback is necessary, a transaction commit may be performed in S649, and the list may be caused empty in S650.

Then, the event may be transmitted to the destination in S628, and the flume agent may be terminated in S630.

In operation S614 to S616, there is a problem that a loss of data stored in the memory, especially an event, occurs due to a system kill signal.

In addition, in operation S636 to S639, there is a problem that a loss of data stored in the memory, especially offset information, occurs due to a system kill signal.

Accordingly, in the present disclosure, as described with reference to FIGS. 1 to 5, a collected file may be changed to an arbitrary file extension (.ing) in a local folder (temp) TF that serves as a temporary storage. Accordingly, even if a system kill signal occurs or the system is down, it is possible to prevent data loss.

Meanwhile, after file collection is finished, the file may be returned to its original file extension, the file may be transmitted from the temporary folder TF, and accordingly, the file may be moved from the temporary folder TF to the destination folder FF.

Figure 7:
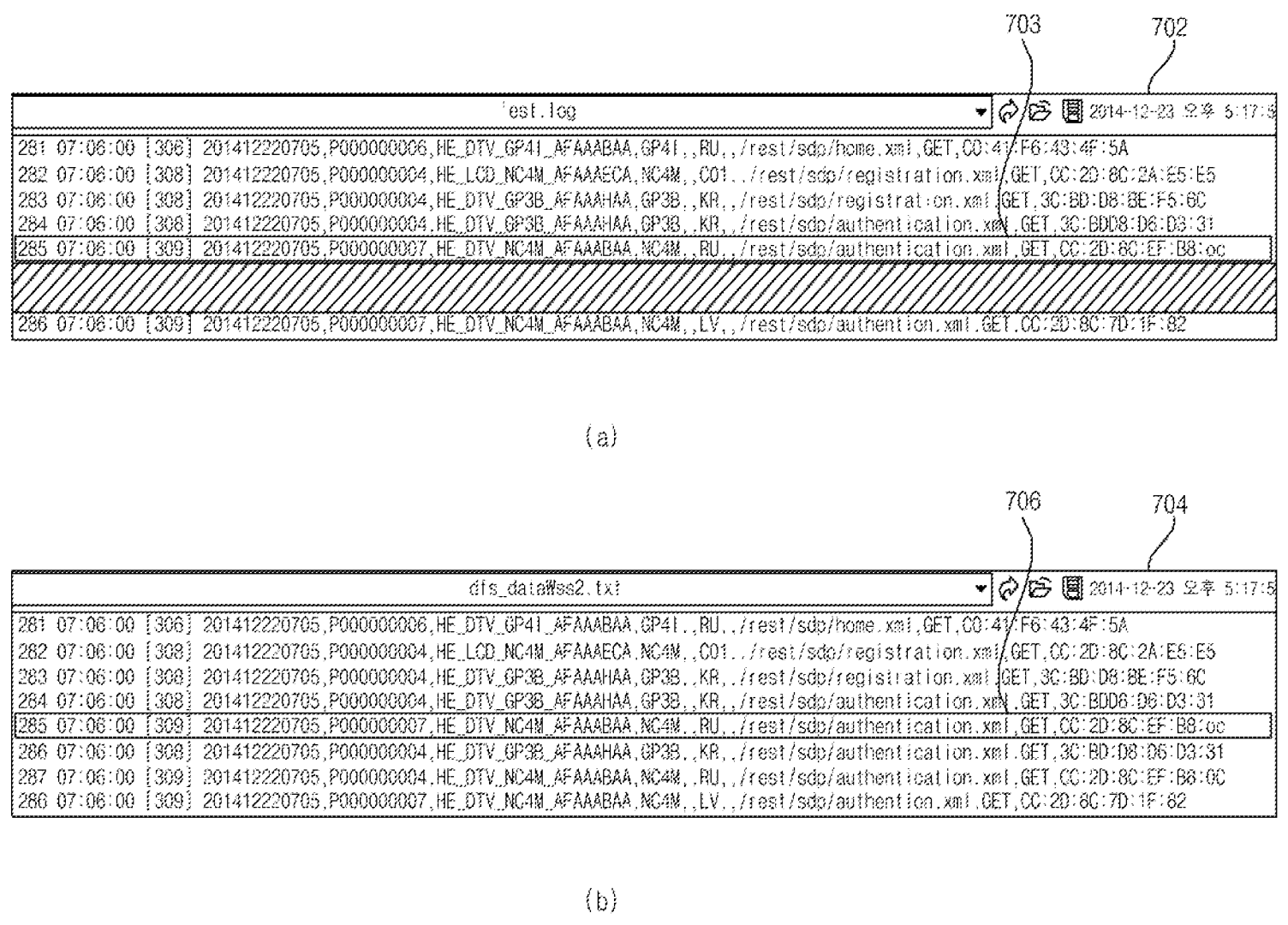

FIG. 7 illustrates source data 702 and collected data 704.

Referring to FIG. 7, an example in which there is data redundancy in a highlighted area 702 of the source data 702 and in a highlighted area 706 of the collected data 704 is illustrated.

In the present disclosure, in order to prevent the occurrence of such data redundancy, a historian file (HSF) that stores a transmission history or a file collection history may be used. Accordingly, when data is redundantly collected, it is possible to determine as to data redundancy before storing the data.

Figure 8:
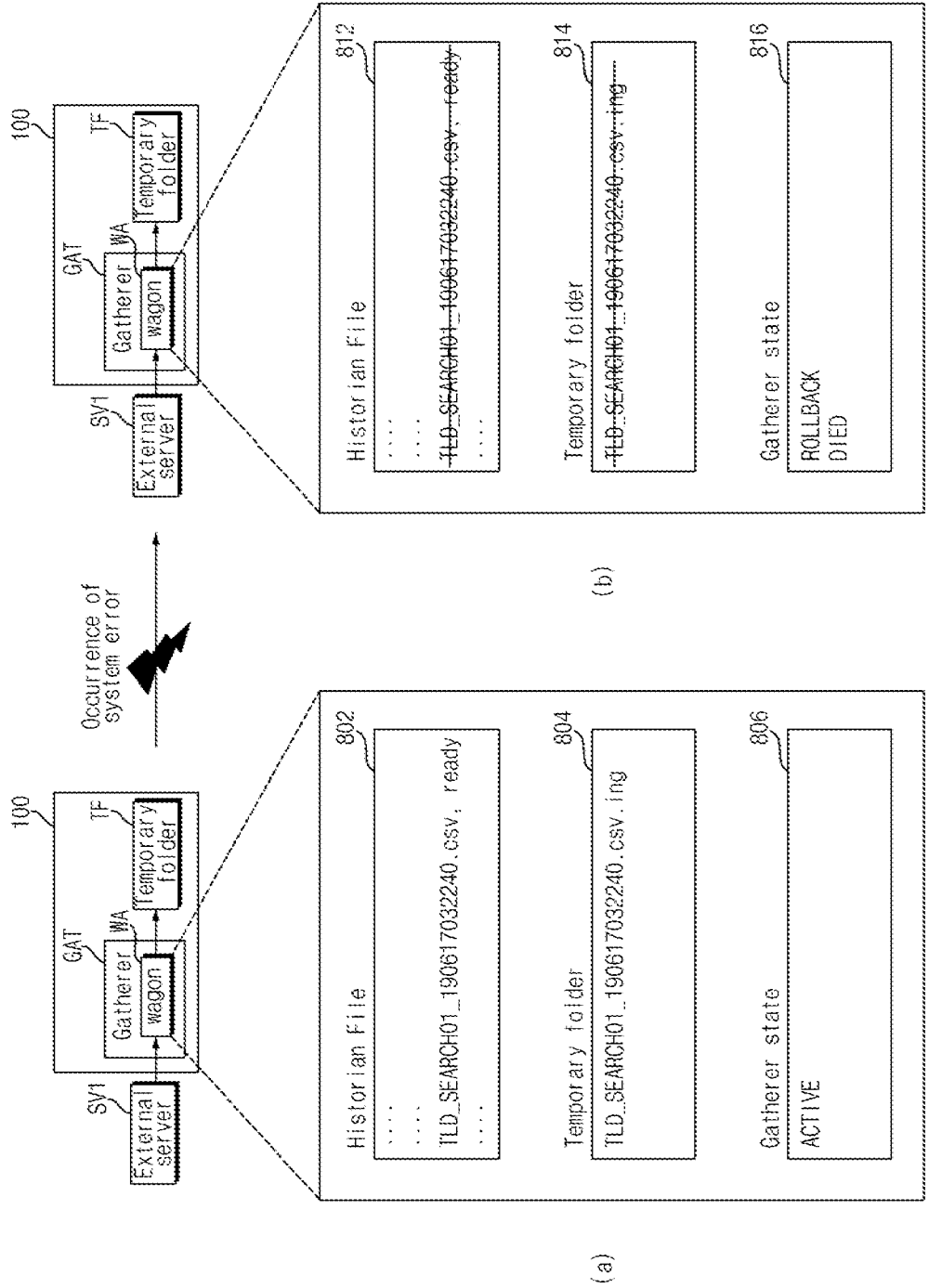

FIG. 8 illustrates an example in which a system error has occurred.

Referring to FIG. 8, there is illustrated an example in which "TLD_SEARCH01_190617032240.csv" is stored in a historian file (HSF) in the server 100 and "TLD_SEARCH01_190617032240.csv.ing" is stored in a temporary folder (TF): in this case, if a system error occurs when the state of the gatherer GAT is Active, the following is that "TLD_SEARCH01_190617032240.csv" is deleted in the historian file (HSF), that "TLD_SEARCH01_190617032240.csv.ing" in the temporary folder (TF) is deleted, and that the state of the gatherer GAT becomes the DIED state and is then changed to the ROLLBACK state.

According to the ROLLBACK state, it is possible to collect data for a file again in which an error has occurred during data collection.

Figure 9:
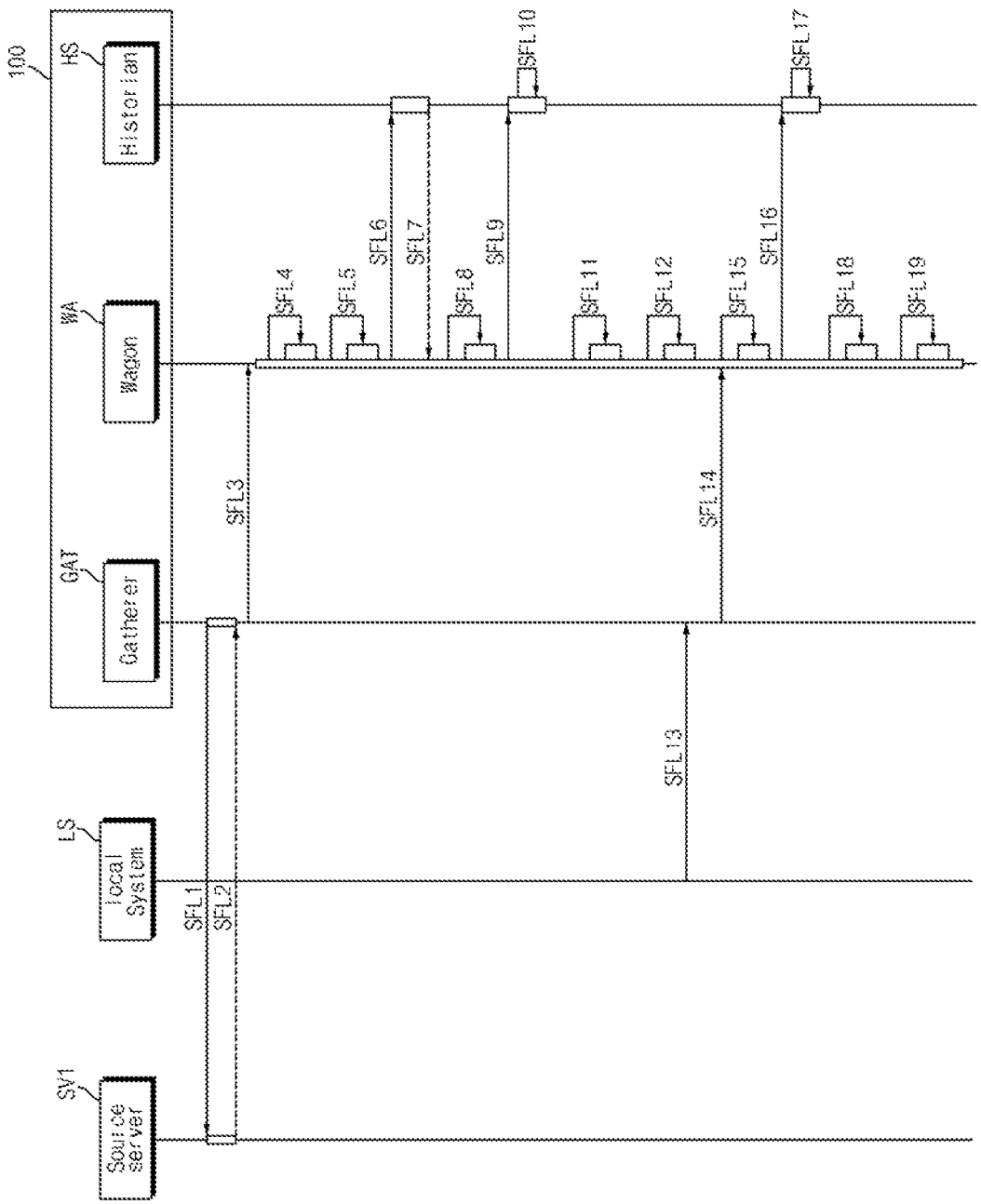

FIG. 9 is a diagram referred to explain ROLLBACK.

Referring to FIG. 9, a gatherer GAT may request a file collection list from an external server SV1 in SFL1, and may receive the file collection list from an external server SV1 in SFL2.

Then, the gatherer GAT may execute a wagon WA in SFL3.

The wagon WA may be set to the state to READY in SFL4, and may collect a file in SFL5.

Then, the wagon WA may determine whether there is a transmission history or a file collection history regarding the file collected in a historian file HSF in SFL6.

If there is a history regarding the file in SFL7, the wagon WA may collect a next file in SFL8.

The wagon WA may determine whether there is a transmission history or a file collection history regarding the next file in SFL9.

When there is no history regarding the next file in SF10, the wagon WA may be converted to the state to ACTIVE in SFL11.

Then, the wagon WA may collect file data or data of file in SFL12.

In this case, when a system kill signal is received from a local system LS in SFL13, the gatherer GAT may transmit a stop command to the wagon WA in SFL14.

The wagon WA may be converted to the state to ROLLBACK in response to the received stop command in SFL15.

Then, the wagon WA may determine whether there is a transmission history or a file collection history regarding the file collected in the historian file HSF in SFL16, and the historian file HSF may delete the transmission history or the file collection history in SFL17.

The wagon WA may delete the collected file in SFL18. Then, the wagon WA may be converted to the DIED state in SFL19.

Figure 10:
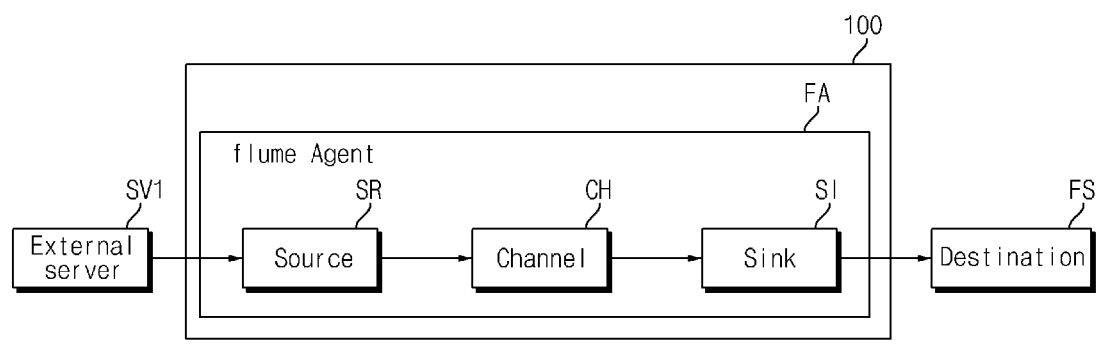

FIG. 10 is a diagram illustrating a flume agent in FIG. 6 and the like.

Referring to FIG. 10, a flume agent FA may operate for data transmission between an external server SV1 and a destination FS.

The flume agent FA may include a source SR, a channel CH, and a sink SI.

A flume, which is an open source project for data collection, may be able to collect and monitor a variety of log data.

A flume event may be a basic unit of data transmitted by a flume.

The flume agent FA may be an independent flume process.

The source SR, which is a flume source, may be a module that collects an event and delivers the event to the channel.

The channel CH, which is a flume channel, may mean a buffer between the source SR and the sink SI.

The sink SI, which is a flume sink, may be a module that delivers a collected log or event to the destination.

The server according to the embodiment of the present disclosure is not restricted by the configuration and the method of the aforementioned embodiments. In order to make various modifications from the embodiments, all or a part of each embodiment can be configured in a manner of being selectively combined.

A server according to an embodiment of the present disclosure includes a gatherer configured to receive a file collection list from an external server, at least one wagon configured to collect data from the external server based on the file collection list received from the gatherer, a historian file configured to store a transmission history or a file collection history, and a destination folder configured to store the data collected by the wagon, and the wagon is further configured to, when an error occurs during data collection, collect data for a file again in which the error occurs. Accordingly, it is possible to quickly collect data again when an error occurs. In particular, since data for a file in which an error occurs is collected again through the wagon before the data is stored, it is possible to quickly collect data again. In addition, when data is redundantly collected, whether the data is redundant may be determined before storing the data.

Meanwhile, the wagon may be further configured to: when the error occurs during the data collection, be changed to a ROLLBACK state and collect, according to the ROLLBACK state, the data for the file again in which the error occurs. Accordingly, it is possible to quickly collect data again when an error occurs.

Meanwhile, the historian file may be further configured to delete the file collection history when the wagon is in the ROLLBACK state due to the error occurring during the data collection. Accordingly, it is possible to quickly collect data again when an error occurs.

Meanwhile, the wagon may be further configured to, when a system kill signal is received during the data collection, be changed to a DIED state, and, when the wagon is executed again, the wagon may be further configured to be changed to a ROLLBACK state and collect, according to the ROLLBACK state, the data for the file again in which the error occurs during the data collection. Accordingly, it is possible to quickly collect data again when an error occurs.

Meanwhile, the wagon and the gatherer may be terminated when the system kill signal is received during the data collection. Accordingly, it is possible to stop the data collection and then quickly collect data again when an error occurs.

Meanwhile, the historian file may be further configured to delete the file collection history when the wagon is in the ROLLBACK state after the wagon is terminated in accordance with the system kill signal. Accordingly, it is possible to stop the data collection and then quickly collect data again when an error occurs.

Meanwhile, the wagon may be further configured to check the file collection history of the historian file and, when there is no file collection history, perform a control to store collected data in the destination folder. Accordingly, whether data is redundant may be determined before data is stored, and, if there is no data redundancy, collected data may be stored.

Meanwhile, the server may further include a temporary folder configured to check the file collection history of the historian file and, when there is no file collection history, temporarily store collected data, and the temporary folder may be further configured to, when file collection is terminated, move a file from the temporary folder to the destination folder. Accordingly, whether data is redundant may be determined before data is stored, and, if there is no data redundancy, collected data may be stored.

Meanwhile, the historian file may be further configured to, when the moving of the file from the temporary folder to the destination folder is completed, store a file collection history according to normal collection completion. Accordingly, it is possible to prevent collection of redundant data.

Meanwhile, the wagon may be further configured to collect data in parallel from the external server. It is possible to quickly collect data.

A server according to another embodiment of the present disclosure includes a communication device configured to receive data from an external server, a processor configured to receive a file collection list from the external server and collect data from the external server based on the file collection list, and a memory configured to store a transmission history or a file collection history, and the processor may be further configured to, when an error occurs during data collection, collect data for a file again in which the error occurs. Accordingly, it is possible to quickly collect data again when an error occurs. In particular, since data for a file in which an error occurs is collected again through the wagon before the data is stored, it is possible to quickly collect data again. In addition, when data is redundantly collected, whether the data is redundant may be determined before storing the data.

Meanwhile, the processor may be further configured to, when the error occurs during the data collection, be changed to a ROLLBACK state and collect, according to the ROLLBACK state, the data for the file again in which the error occurs. Accordingly, it is possible to quickly collect data again when an error occurs.

Meanwhile, the processor may be further configured to delete the file collection history when the processor is in the ROLLBACK state due to the error occurring during the data collection. Accordingly, it is possible to quickly collect data again when an error occurs.

Meanwhile, the processor may be further configured to, when a system kill signal is received during the data collection, stop the data collection, and, when the data collection is restarted, collect the data for the file again in which the error occurs during the data collection. Accordingly, it is possible to quickly collect data again when an error occurs.

Meanwhile, the processor may be further configured to delete the file collection history when the data collection is stopped in accordance with the system kill signal. Accordingly, it is possible to stop the data collection and then quickly collect data again when an error occurs.

Meanwhile, the memory may include a destination folder configured to store data collected by the processor, and the processor may be further configured to check the file collection history of the memory and, when there is no file collection history, perform a control to store collected data in the destination folder. Accordingly, whether data is redundant is determined before the data is stored, and when the data is not redundant, the collected data may be stored.

Meanwhile, the memory may include a temporary folder configured to temporarily store the collected data, and the temporary folder may be further configured to, when file collection is terminated, move a file from the temporary folder to the destination folder. Accordingly, whether data is redundant is determined before the data is stored, and when the data is not redundant, the collected data may be stored.

Meanwhile, the processor may be further configured to, when the moving of the file from the temporary folder to the destination folder is completed, perform a control to store a file collection history according to normal collection completion. Accordingly, whether data is redundant is determined before the data is stored, and when the data is not redundant, the collected data may be stored.

In addition, although the preferred embodiments of the present disclosure have been illustrated and described above, the present disclosure is not limited to the specific embodiments described above, and the technical field to which the present disclosure belongs without departing from the gist of the present disclosure claimed in the claims. In addition, various modifications are possible by those of ordinary skill in the art, and these modifications should not be understood individually from the technical spirit or prospect of the present disclosure.

What is claimed is:

1. A server, comprising:
   a gatherer configured to receive a file collection list from an external server;
   at least one wagon configured to collect data from the external server based on the file collection list received from the gatherer;
   a historian file configured to store a transmission history or a file collection history;

a destination folder configured to store the data collected by the wagon; and a temporary folder configured to check the file collection history of the historian file and, when there is no file collection history, temporarily store collected data, wherein the wagon is further configured to, when an error occurs during data collection, collect data for a file again in which the error occurs, wherein the temporary folder is further configured to, when file collection is terminated, move a file from the temporary folder to the destination folder.

2. The server of claim 1, wherein the wagon is further configured to:

when the error occurs during the data collection, be changed to a ROLLBACK state and collect, according to the ROLLBACK state, the data for the file again in which the error occurs.

3. The server of claim 2, wherein the historian file is further configured to delete the file collection history when the wagon is in the ROLLBACK state due to the error occurring during the data collection.

4. The server of claim 1, wherein the wagon is further configured to, when a system kill signal is received during the data collection, be changed to a DIED state; and wherein, the wagon may be further configured to, when the wagon is executed again, be changed to a ROLLBACK state and collect, according to the ROLLBACK state, the data for the file again in which the error occurs during the data collection.

5. The server of claim 4, wherein the wagon and the gatherer are terminated when the system kill signal is received during the data collection.

6. The server of claim 4, wherein the historian file is further configured to delete the file collection history when the wagon is in the ROLLBACK state after the wagon is terminated in accordance with the system kill signal.

7. The server of claim 1, wherein the wagon is further configured to:

check the file collection history of the historian file; and when there is no file collection history, perform a control to store collected data in the destination folder.

8. The server of claim 1, wherein the historian file is further configured to, when the moving of the file from the temporary folder to the destination folder is completed, store a file collection history according to normal collection completion.

9. The server of claim 1, wherein the wagon is further configured to collect data in parallel from the external server.

10. A server, comprising:

a communication device configured to receive data from an external server;

a processor configured to receive a file collection list from the external server and collect data from the external server based on the file collection list; and a memory configured to store a transmission history or a file collection history, wherein the processor is further configured to, when an error occurs during data collection, collect data for a file again in which the error occurs, wherein the memory comprises a destination folder configured to store data collected by the processor, wherein the processor is further configured to:

check the file collection history of the memory; and when there is no file collection history, perform a control to store collected data in the destination folder.

11. The server of claim 10, wherein the processor is further configured to:

when the error occurs during the data collection, be changed to a ROLLBACK state and collect, according to the ROLLBACK state, the data for the file again in which the error occurs.

12. The server of claim 11, wherein the processor is further configured to delete the file collection history when the processor is in the ROLLBACK state due to the error occurring during the data collection.

13. The server of claim 10, wherein the processor is further configured to:

when a system kill signal is received during the data collection, stop the data collection; and when the data collection is restarted, collect the data for the file again in which the error occurs during the data collection.

14. The server of claim 13, wherein the processor is further configured to delete the file collection history when the data collection is stopped in accordance with the system kill signal.

15. The server of claim 11, wherein the memory comprises a temporary folder configured to temporarily store the collected data, wherein the temporary folder is further configured to, when file collection is terminated, move a file from the temporary folder to the destination folder.

16. The server of claim 15, wherein the processor is further configured to, when the moving of the file from the temporary folder to the destination folder is completed, perform a control to store a file collection history according to normal collection completion.

* * * * *